US005928357A

United States Patent [19]
Underwood et al.

[11] Patent Number: 5,928,357
[45] Date of Patent: Jul. 27, 1999

[54] CIRCUITRY AND METHOD FOR PERFORMING BRANCHING WITHOUT PIPELINE DELAY

[75] Inventors: Keith Frederick Underwood, El Dorado Hills, Calif.; Richard Joseph Durante, Folsom, Calif.

[73] Assignee: Intel Corporation, Santa Clara, Calif.

[21] Appl. No.: 08/878,659

[22] Filed: Jun. 19, 1997

Related U.S. Application Data

[63] Continuation of application No. 08/307,373, Sep. 15, 1994, abandoned.

[51] Int. Cl.[6] .................................. G06F 9/00; G06F 9/06
[52] U.S. Cl. .......................... 712/235; 712/226; 712/205; 712/237; 712/245
[58] Field of Search ...................................... 395/378, 379, 395/381, 382, 383, 567, 571, 580, 582, 584, 595, 585, 586, 800.01

[56] References Cited

U.S. PATENT DOCUMENTS

| Re. 35,794 | 5/1998 | Johnson | 395/586 |
|---|---|---|---|
| 4,701,842 | 10/1987 | Olnowich | 395/581 |
| 5,136,696 | 8/1992 | Beckwith et al. | 395/375 |
| 5,136,697 | 8/1992 | Johnson | 395/375 |
| 5,293,499 | 3/1994 | Jensen | 395/375 |
| 5,321,820 | 6/1994 | Nakajima | 395/376 |
| 5,381,531 | 1/1995 | Hanawa et al. | 395/375 |
| 5,434,986 | 7/1995 | Kuslak et al. | 395/375 |
| 5,485,587 | 1/1996 | Matsuo et al. | 395/375 |
| 5,504,870 | 4/1996 | Mori et al. | 395/375 |
| 5,522,053 | 5/1996 | Yoshida et al. | 395/375 |
| 5,530,825 | 6/1996 | Black et al. | 395/375 |
| 5,581,718 | 12/1996 | Grochowski et al. | 395/382 |
| 5,592,637 | 1/1997 | Matsuo | 395/584 |
| 5,606,676 | 2/1997 | Grochowski et al. | 395/586 |
| 5,615,386 | 3/1997 | Amerson et al. | 395/585 |
| 5,642,500 | 6/1997 | Inoue | 395/580 |
| 5,696,958 | 12/1997 | Mowry et al. | 395/582 |
| 5,737,561 | 4/1998 | Dulong | 395/391 |

OTHER PUBLICATIONS

"Optimizing Systems Performance Based on Pentium Processors" by John Novitsky, Mani Azimi, Raheel Ghaznavi –Intel Corporation, Santa Clara, CA; pp. 63–72;1993 IEEE.

*Primary Examiner*—Ayaz R. Sheikh
*Assistant Examiner*—Raymond N Phan
*Attorney, Agent, or Firm*—Blakely, Sokoloff, Taylor & Zafman

[57] ABSTRACT

The pipeline architecture minimizes delays incurred during execution of branch instructions. While a first instruction is executing, a second instruction is fetched and is ready for execution at the beginning of the next clock cycle. Control logic examines the fetched instruction during the first clock cycle to determine whether the instruction is a branch instruction which may indicate that the address of the next instruction is not the next sequential address. Flags which indicate the state of the system are examined to determine if the address of the instruction is the next sequential address or the address indicated in the branch instruction. As this is performed during the fetch clock cycle of the branch instruction, during execution of the branch instruction, the instruction at the address selected is fetched and is ready for execution without delay.

16 Claims, 6 Drawing Sheets

```
!####################################################################
!                    fdflags [0] = Sign
!                    fdflags [1] = Carry out
!                    fdflags [1] = Overflow
!                    fdflags [1] = Zero
!                    fdflags [1] = Hardware 0
!                    fdflags [1] = Hardware 1
!                    fdflags [1] = Hardware 2
!                    fdflags [1] = Hardware 3
!####################################################################
[OpJMP]      JumpReg;
[OpJHW0]     IF (fdflags [4] )        THEN  JumpReg  ELSE  PCPlus1;
[OpJNHW0]    IF (NOT fdflags [4] )    THEN  JumpReg  ELSE  PCPlus1;
[OpJHW1]     IF (fdflags [5] )        THEN  JumpReg  ELSE  PCPlus1;
[OpJNHW1]    IF (NOT fdflags [5] )    THEN  JumpReg  ELSE  PCPlus1;
[OpJHW2]     IF (fdflags [6] )        THEN  JumpReg  ELSE  PCPlus1;
[OpJNHW2]    IF (NOT fdflags [6] )    THEN  JumpReg  ELSE  PCPlus1;
[OpJHW3]     IF (fdflags [7] )        THEN  JumpReg  ELSE  PCPlus1;
[OpJNHW3]    IF (NOT fdflags [7] )    THEN  JumpReg  ELSE  PCPlus1;
[OpJZ]       IF (fdflags [3] )        THEN  JumpReg  ELSE  PCPlus1;
[OpJNZ]      IF (NOT fdflags [3] )    THEN  JumpReg  ELSE  PCPlus1;
[OpJO]       IF (fdflags [2] )        THEN  JumpReg  ELSE  PCPlus1;
[OpJNO]      IF (NOT fdflags [2] )    THEN  JumpReg  ELSE  PCPlus1;
[OpJA]       IF (fdflags [1] AND NOT fdflags [3] )
                                      THEN  JumpReg  ELSE  PCPlus1;
[OpJAE]      IF (fdflags [1] )        THEN  JumpReg  ELSE  PCPlus1;
[OpJB]       IF (NOT fdflags [1] )    THEN  JumpReg  ELSE  PCPlus1;
[OpJBE]      IF (NOT fdflags [1] OR fdflags [3] )
                                      THEN  JumpReg  ELSE  PCPlus1;
[OpJG]       IF (NOT fdflags [3] AND (fdflags [0] XNOR fdflags [2] ))
                                      THEN  JumpReg  ELSE  PCPlus1;
[OpJGE]      IF (fdflags [0] XNOR fdflags [2] )
                                      THEN  JumpReg  ELSE  PCPlus1;
[OpJL]       IF (fdflags [0] XOR fdflags [2] )
                                      THEN  JumpReg  ELSE  PCPlus1;
[OpJLE]      IF (fdflags [3] OR (fdflags [0] XOR fdflags [2] ))
                                      THEN  JumpReg  ELSE  PCPlus1;
!####################################################################
[OpCALL]     JumpReg;
!####################################################################
```

*Figure 5b*

CIRCUITRY AND METHOD FOR PERFORMING BRANCHING WITHOUT PIPELINE DELAY

This is a continuation of application Ser. No. 08/307,373, filed Sep. 15, 1994, now abandoned.

BACKGROUND OF THE INVENTION

1. Field of the Invention

The present invention relates to an improved pipeline computer architecture. More particularly the present invention relates to a pipeline computer architecture in which delays caused by branch instructions are minimized.

2. Art Background

Pipeline computer architectures increase throughput by pipelining instructions through stages. For example, when a first instruction is executing, a second instruction is fetched from memory such that at the completion of execution of the first instruction, the second instruction can be immediately executed. Therefore, the delay that would be incurred by performing the fetch at the time the execution of the first instruction is complete is eliminated. However, a pipeline architecture works only as well as the location of the subsequent instructions can be determined. When the fetch of the next instruction is being performed during execution of the current instruction, the next instruction is typically the next sequential instruction in memory. If a branch instruction occurs, the fetch is aborted and subsequently restarted to fetch the proper instruction as indicated by the branch instruction which had been executed. Therefore, a delay of at least one clock cycle is incurred. The present invention provides for a method and a system for minimizing these delays.

SUMMARY OF THE INVENTION

It is therefore the object of the present invention to provide a method and system for minimizing delays caused by branch instructions in a pipeline computer architecture.

The pipeline architecture of the present invention eliminates the extra cycles incurred when a branch instruction is encountered. More particularly, during the execution of an instruction, such as an arithmetic instruction, a fetch of the next instruction, for example a branch instruction, occurs. At the latter phase of the clock cycle, the opcode of the branch instruction and the state of predetermined flags of the system are provided to control logic which determines whether the branch will be true or false. This output signal generated by the control logic is input to a multiplexor which receives as input the address of a next instruction from various sources, for example, the program counter incrementing device which generates the address of the next sequential instruction in memory, and the address identified in the branch instruction. Thus if the control logic determines a true condition, the signal output causes the selection of the input received from the line containing the address indicated in the branch instruction. The selected address is available at the beginning of the next fetch cycle, which coordinates with the execution of the branch instruction. Therefore, no delay is incurred by having to subsequently fetch the instruction at the branch address after execution of the branch instruction has been completed.

BRIEF DESCRIPTION OF THE DRAWINGS

The objects, features and advantages of the present invention will be apparent from the following detailed description in which:

FIG. 5b is an example of the flags utilized in the logic implemented to generate the multiplexor select signal to select the proper address of the next instruction to be executed in accordance with the teachings of the present invention.

DETAILED DESCRIPTION

In the following description, for purposes of explanation, numerous details are set forth in order to provide a thorough understanding of the preferred embodiment of the present invention. However, it will be apparent to one skilled in the art that the present invention may be practiced without these specific details. In addition, well known circuits have been shown in block diagram form rather than in detail in order to avoid unnecessarily obscuring the present invention.

Figure 1:
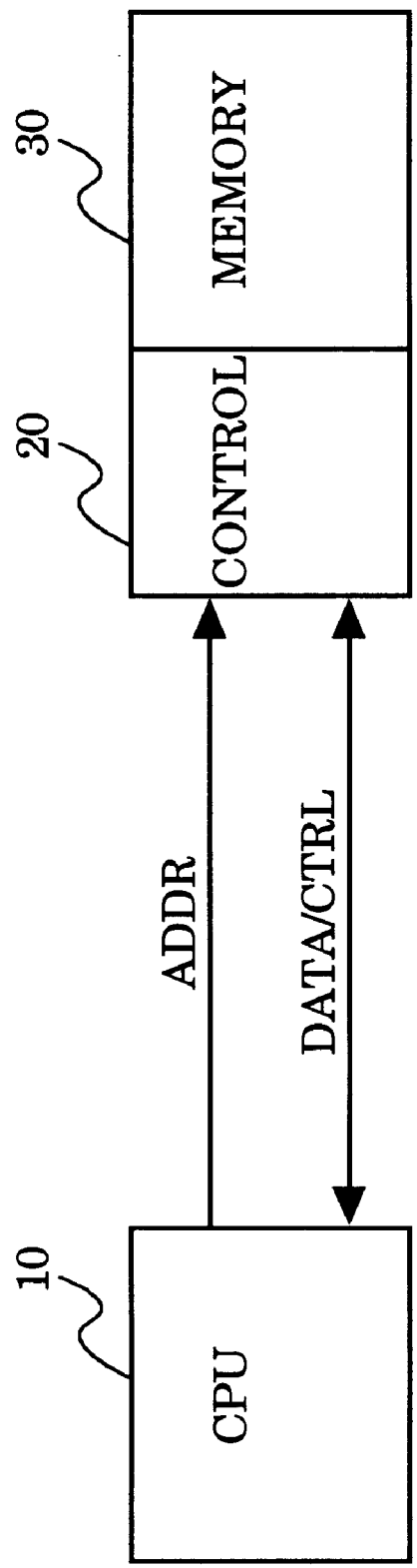
FIG. 1 is a block diagram illustration of a system constructed in accordance with the teachings of the present invention.

FIG. 1 is a simplified block diagram showing a system which employs a pipeline architecture and method of the present invention. CPU 10 provides and address of memory 30 to access. This memory may be of any type of memory, such as flash EEPROM. Also communicated are data and control information to provide the type of operation to be performed and the data, if needed, to perform the operation. In response to a memory read operation, for example, data would be provided back to the CPU 10. The control device 20 controls the access to the memory 30. This enables some of the control functionality to be offloaded from the CPU 10 to improve efficiency of the system.

In the present embodiment, the control device 20 is located on the same component as the memory 30. However, it should be readily apparent that the control device 20 can be separate from the memory 30 or embodied into the functionality of the CPU 10. The control includes the pipeline processor which operates in accordance with the teachings of the present invention.

Figure 2:
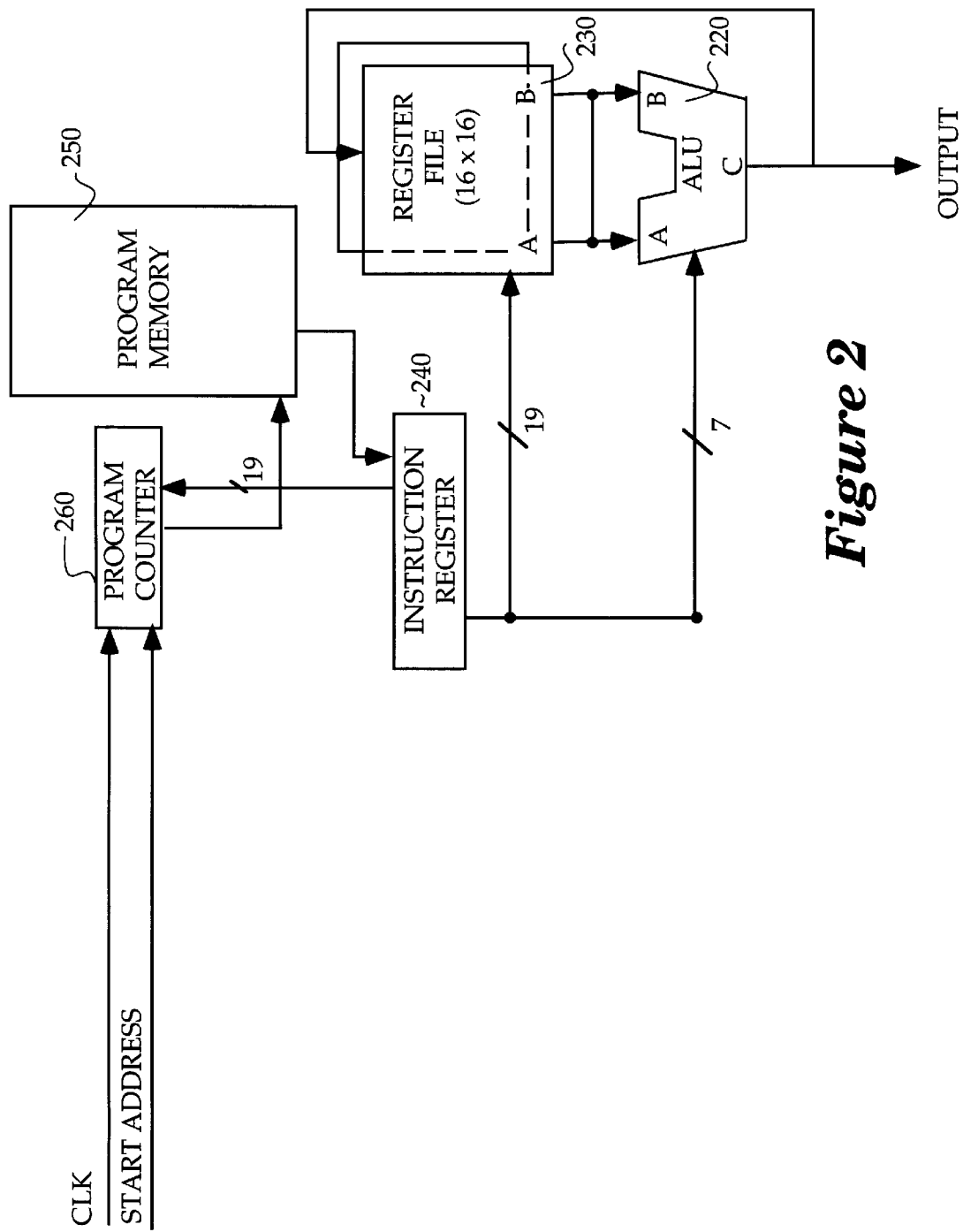
FIG. 2 is a block diagram illustration of one embodiment of the pipeline architecture of the present invention.

FIG. 2 is a block diagram which illustrates one embodiment of the control device 20 of FIG. 1. Referring to FIG. 2, the control device incorporates a number of elements including a processor or ALU 220, register file 230, instruction register 240, code storage 250, and program counter/call stack 260. In the present embodiment, a three phase clock which is utilized by the pipeline processor 220 to perform one instruction per clock cycle. The instructions are stored in the code storage 250 and are retrieved by the program counter 260 and input to the instruction register 240 where the ALU 220 accesses the instruction to execute the same.

The architecture is pipelined such that the program counter performs a fetch of the next instruction while the current instruction latched into the instruction register is executed by the ALU 220. Thus, each instruction requires one clock cycle to complete execution. In the prior art, if a branch instruction were to occur, the fetch of the next instruction, which is typically at the next sequential address, would be aborted and the branch address, identified in the branch instruction which just finished completion, would have to be fetched for execution. Thus, at least one clock cycle delay would result. As will be discussed in more detail below, the program counter includes logic to determine prior to the actual execution of the branch instruction whether a branch instruction tests true and a branch is to occur at an address indicated in the instruction such that the fetch of the proper next instruction occurs during the execution of the branch instruction.

Figure 3:
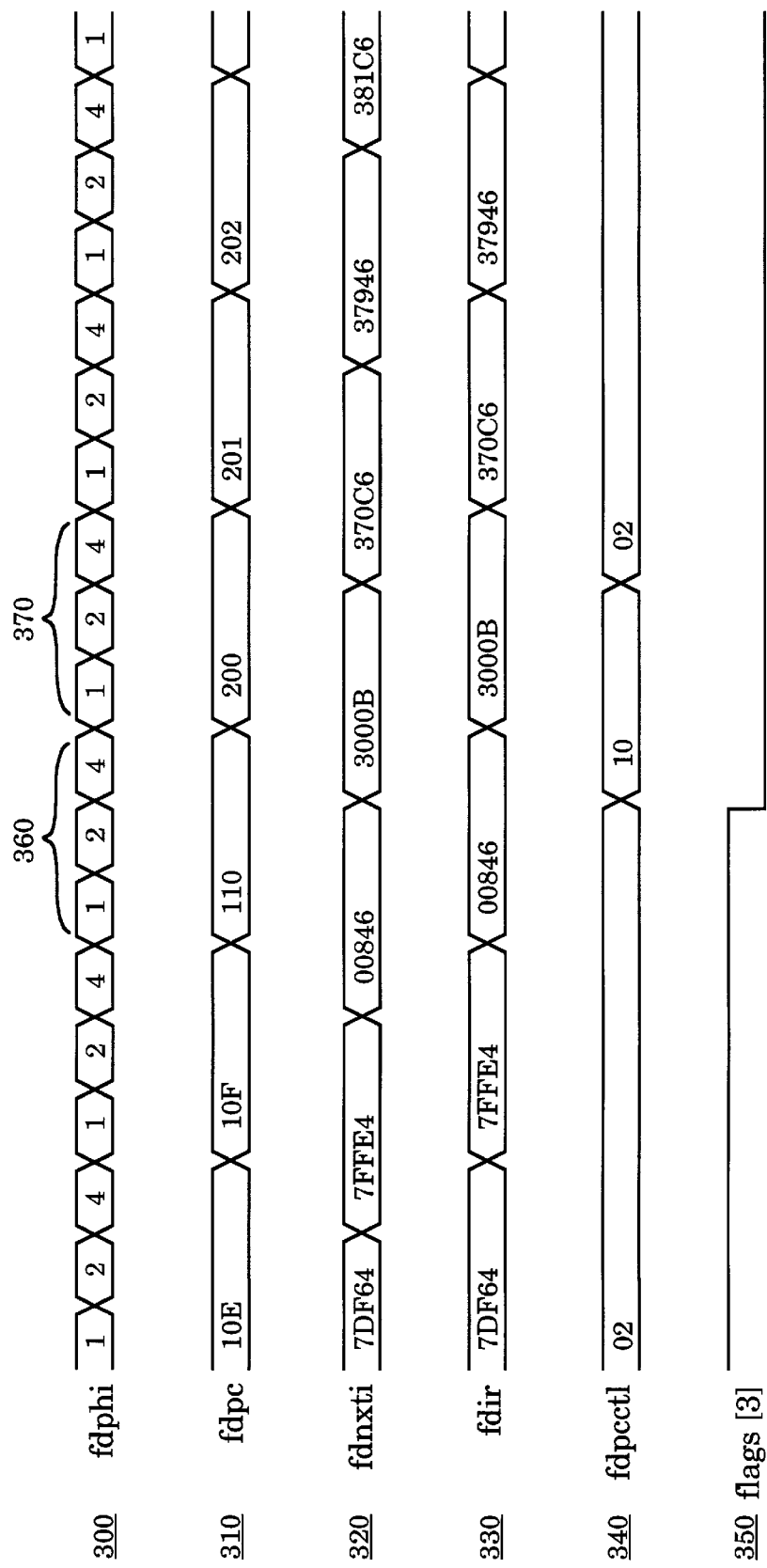
FIG. 3 are timing diagrams illustrating the process of the present invention.

This is best illustrated by the timing diagrams of FIG. 3. The timing diagram labeled FDPHI 300 illustrates a three phase clock, phase 1, 2 and 4 generated as input. The present embodiment utilizes a three phase clock; however, it is readily apparent to one skilled in the art that any n-phase clock system (where n is greater than or equal to one) can be used. Timing diagram FDPC 310 illustrates the program counter value that provides an address to the memory to retrieve the next instruction. Timing diagram FDNXTI 320 shows when the next instruction has been fetched and is valid. Timing diagram FDIR 330 illustrates the instruction that is located in the instruction register and is indicative of that instruction currently executed by the processor. Timing diagram FDPCCTL indicates the control signal which selects the source that the program counter uses to address the next instruction to be fetched. In the present illustration, a value 02 indicates to select the source that provides the next sequential address and code 10 indicates to select the input that provides the address indicated in the branch instruction.

The flags timing diagram 350 shows the boolean combination of the flags maintained and used by the program counter to determine whether a branch instruction address is to be the next instruction address to be fetched. This is better explained with reference to a particular clock cycle 360. At clock cycle 360 the instruction address 110 is fetched and at phase 4 of clock cycle 360, the next instruction is fetched and determined to be a branch instruction (e.g. code 3000B). During the phase 4, the opcode of the branch instruction indicative that it is a branch instruction and the state of the flags are input to a control unit to determine whether the address contained in the branch instruction or the next sequential address is the next address to be fetched.

In the present embodiment, the boolean combination of flags result in a low state (shown in timing diagram 350), which in this embodiment indicates that the branch tests true and the address contained in the branch instruction is to be fetched. Thus, at the beginning of the next clock cycle 370, address 200 is the address of the next instruction to be fetched. Address 200 is the address contained in the branch instruction 3000B; the instruction at address 200 is fetched while the branch instruction 3000B is executed. Therefore, the branch instruction and fetch of the next instruction is complete within one clock cycle without a delay due to the branch condition.

The flags are preferably the system flags generated by the ALU and any special hardware flags provided in the system. For example, in the present embodiment, 8 flags are accessed, 4 hardware flags and 4 flags from the ALU. Examples of flags include a zero value resultant of an arithmetic operation, an overflow value, a carry value and a sign value. These eight flags cover the branch or jump in conditions that may be tested and acted upon during execution.

Figure 4:
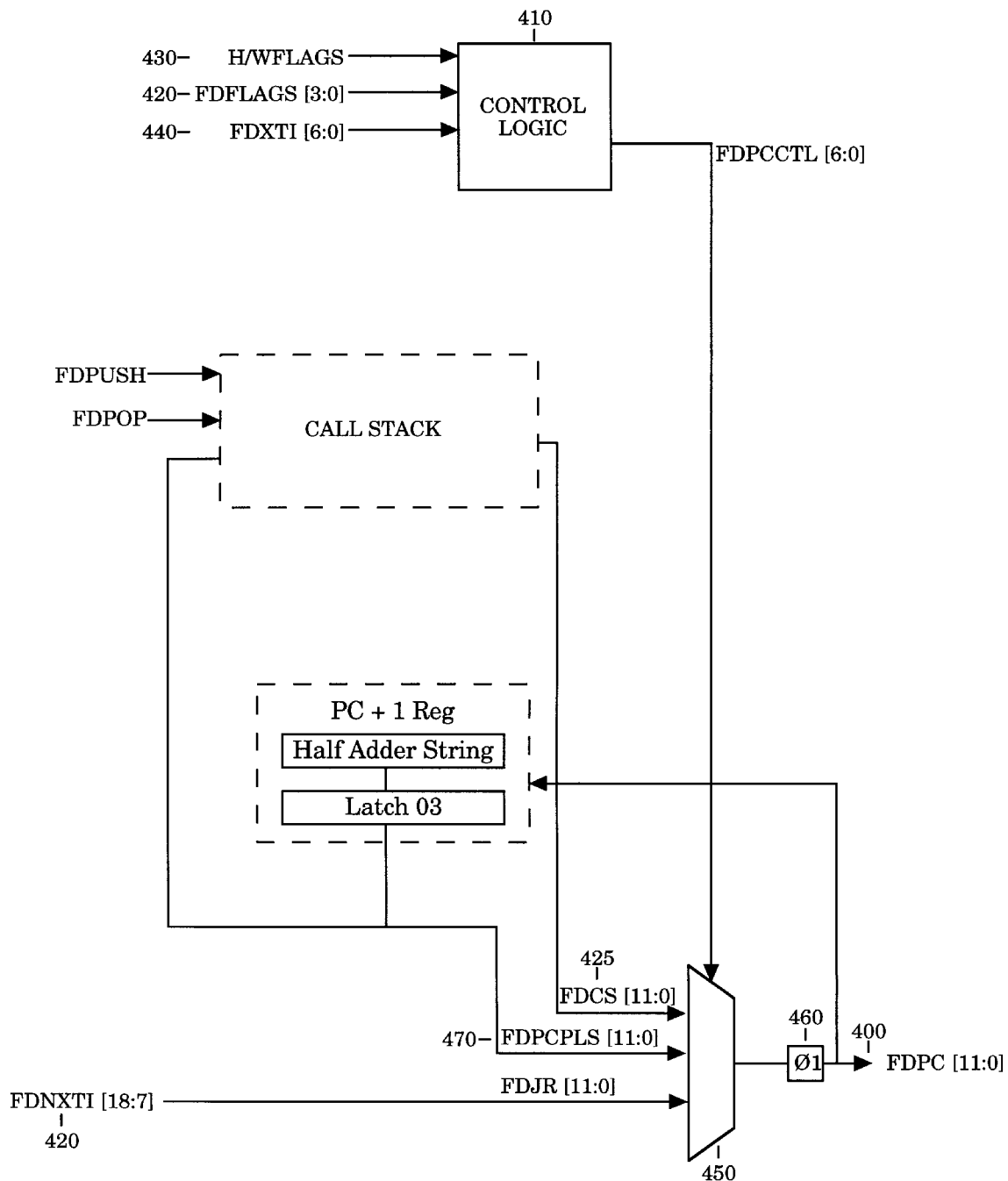
FIG. 4 is a simplified block diagram showing the structure which enables the elimination of extra clock cycles encountered during the execution of branch instructions in a pipeline architecture.

A simplified block diagram of the program counter logic used to perform the pipeline processing in which clock cycle delays due to branch instructions are eliminated is shown in FIG. 4.

The output of this block diagram is the FDPC signal 400 which indicates the source of the address of the next instruction to be executed. The input to the control logic 410 are the flags from the ALU 420, the hardware flags 430 and the opcode of the branch instruction to be executed 440. The control logic 410 determines whether a true condition or false condition exists such that, if a true condition occurs, the address indicated by the branch instruction will be fetched as the next instruction. The control signal FDPCCTL is the select input to a multiplexor 450 which selects one of a plurality of inputs as the program counter address provided to fetch the next instruction. In this embodiment, a latch 460 is preferably provided to maintain the program counter value through the next clock cycle. In this embodiment, the inputs to the multiplexor are the next sequential address FDPCPLS 470, the address in the jump or branch instruction FDNXTI, which is identified as FDJR 420, and call stack 425. Thus, in one embodiment, the control logic 410 determines whether the jump address 420 or the next sequential (PC+1) address 470 is to be output as the address of the next instruction to be fetched. Additionally, this control circuit 410 can be used to perform jumps to subroutines and returns from subroutines using a call stack.

Figure 5A:
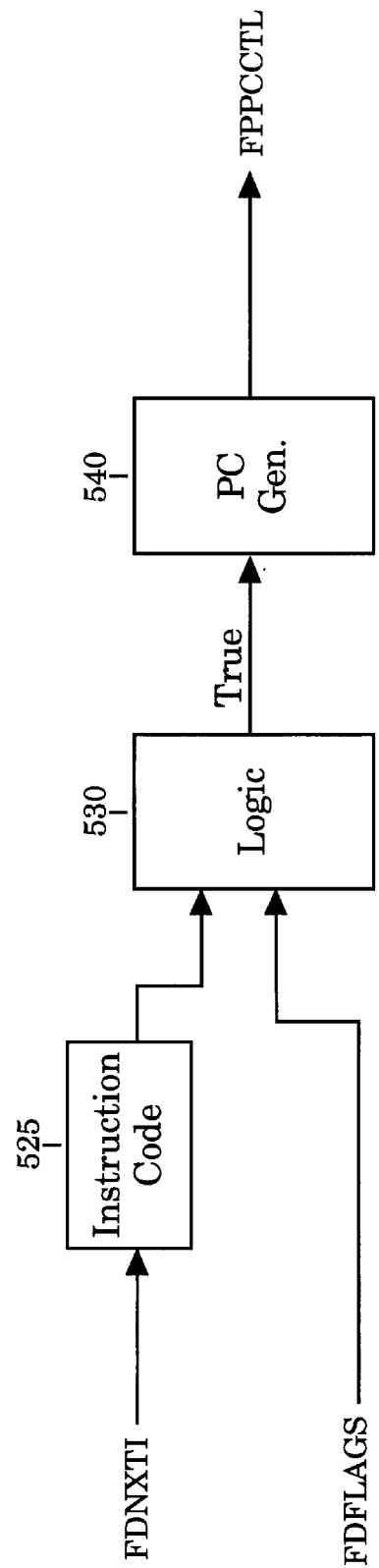
FIG. 5a is a block diagram illustrating the control component which generates the signal necessary to select the proper address in response to a branch instruction to be executed.

FIG. 5a is a simplified diagram of the control logic 410 of FIG. 4. As can be seen, the flags and the branch instruction op codes are provided and the opcodes and the flags are combined in a logic manner to determine whether a true condition exists. The opcode indicates what conditions must exist for true condition and the flags indicate the condition or state of the processor. The FPPCCTL signal is then generated by the program counter generator 540 to provide the input to the multiplexor 450 of FIG. 4. The logic 530 is preferably simple combinational logic as represented by the code set forth in FIG. 5b.

Therefore, it can be seen that the pipeline architecture of the present invention borrows time during the very end of a fetch of a branch instruction to determine the next instruction to be fetched, thereby ensuring that each instruction does not take more than a clock cycle to execute. Furthermore, cycles are not lost by having to abort a current fetch instruction and perform a new fetch due to the occurrence or execution of a branch instruction.

Although the invention has been described in conjunction with the preferred embodiment, it is evident that numerous alternatives modifications, variations and uses will be apparent to those skilled in the art in light of the foregoing description.

What is claimed is:

1. In a pipelined processing system, an apparatus that indicates a next instruction to be executed, comprising:

control logic that receives an op-code of a branch instruction and flags indicating states of the system, wherein the control logic generates a control signal by logically combining the op-code and the flags, the control signal being output during a first clock cycle; and a select circuit that receives a first address that is a next sequential address with respect to an address previously executed and a second address that is indicated by the branch instruction, and outputs an address of the next instruction to be executed in response to the control signal during a second clock cycle.

2. The apparatus of claim 1, wherein the select circuit further receives an address from a call stack.

3. A method for determining an address of a next instruction to be executed in a pipelined processing system, comprising the steps of:

receiving addresses during a first clock cycle comprising an address next in sequence to a first address previously executed and an address indicated by a second instruction;

choosing the address of the next instruction to be executed from among the addresses received based upon a logical combination of flags indicating states of the system and upon an op-code of the second instruction; and outputting the address of the next instruction during a second clock cycle.

4. The method of claim 3, wherein the step of choosing the address of the next instruction comprises the steps of:

determining whether the second instruction is to be executed; and if the second instruction is to be executed, choosing the address indicated by the second instruction as the next instruction.

5. In a pipeline processing system comprising a processor which executes a first instruction during a first clock cycle and a fetch mechanism to fetch a second instruction from memory during the first clock cycle for execution by the processor during the a second clock cycle, the system further comprising an apparatus for identifying addresses of instructions to be fetched, comprising:

control logic coupled to receive as input an op-code of the second instruction to be executed, and flag signals indicative of states of the system, the control logic logically combining the op-code and flags to generate a select signal, the control logic outputting the select signal; and a multiplexor coupled to receive a plurality of addresses, the plurality of addresses comprising a next sequential address and an address identified in the second instruction, wherein either the next sequential address or the address identified in the second instruction comprises a next received address, the multiplexor outputting to the fetch mechanism during the second clock cycle the next received address based upon a state of the select signal output selected by the select signal generated by the control logic.

6. The system as set forth in claim 5 wherein the second instruction comprises a branch condition.

7. The system as set forth in claim 5, wherein the second instruction comprises a jump condition.

8. The system as set forth in claim 5, wherein the second instruction comprises a return from routine condition.

9. In a pipeline processing system comprising a processor which executes a first instruction during a first clock cycle and a fetching means to fetch a second instruction from a memory during the first clock cycle for execution by the processor during a second clock cycle, circuit means comprising:

control means coupled to receive as input an op-code of the second instruction to be executed, the control logic further coupled to receive as inputs flag signals indicative of states of the system, the control logic logically combining the inputs to generate a select signal; and a multiplexing means coupled to receive a plurality of addresses, the plurality of addresses comprising a next sequential address to an address of the second instruction, and an address identified in the second instruction, wherein either the next sequential address or the address identified in the second instruction comprises a next received address, the multiplexor outputting to the fetch mechanism during the second clock cycle the next received address based upon a state of the select signal;

such that when the op-code of the second instruction to be executed during the second clock cycle indicates that execution of the second instruction may result in an instruction other than the instruction at the next sequential address, the select signal causes the multiplexing means to output the address identified in the second instruction during the second clock cycle so that the instruction at the address identified in the second instruction is fetched during a third clock cycle.

10. The system as set forth in claim 9 wherein the second instruction comprises a branch condition.

11. The system as set forth in claim 9, wherein the second instruction comprises a jump condition.

12. The system as set forth in claim 9, wherein the second instruction comprises a return from routine condition.

13. In a pipeline processing system comprising a processor which executes instructions and a fetch mechanism to fetch instructions from memory for execution by the processor, the instructions comprising an op-code indicative of the operation to be performed when an instruction is executed, a method for identifying addresses of instructions to be fetched, comprising the steps of:

executing a first instruction during a first clock cycle;

fetching a second instruction during the first clock cycle;

reviewing the op-code of the second instruction to determine if execution of the second instruction results in an instruction other than the instruction at the location next sequentially to a second instruction to be executed after the second instruction;

receiving flag signals indicative of states of the system;

generating a select signal by logically combining the op-code and the flag signals; and selecting one of a plurality of addresses as the address of a third instruction to be fetched during execution of the second instruction during the second clock cycle, said plurality of addresses comprising a next sequential address to the address of the second instruction, and an address identified in the second instruction, said step of selecting using the select signal to select the address of the third instruction.

14. The method as set forth in claim 13, wherein the second instruction comprises a branch condition.

15. The method as set forth in claim 13, wherein the second instruction comprises a jump condition.

16. The method as set forth in claim 13, wherein the second instruction comprises a return from routine condition.

* * * * *